United States Patent [19]

Ellis

[11] Patent Number: 5,114,730

[45] Date of Patent: May 19, 1992

[54] PROCESS FOR MAKING DARK COCOA

[75] Inventor: Larry D. Ellis, St. Louis County, Mo.

[73] Assignee: Conslidated Flavor Corporation, Bridgeton, Mo.

[21] Appl. No.: 616,376

[22] Filed: Nov. 21, 1990

[51] Int. Cl.$^5$ .................................................. A23G 1/00
[52] U.S. Cl. ...................................... 426/593; 426/631
[58] Field of Search .................... 426/593, 631, 262

[56] References Cited

U.S. PATENT DOCUMENTS

| | | | |
|---|---|---|---|
| 2,745,746 | 5/1956 | Jones | 426/593 |
| 2,835,585 | 5/1958 | Rusoff | 426/431 |
| 2,954,293 | 9/1960 | Rusoff | 426/417 |
| 2,957,769 | 10/1960 | Rusoff | 426/593 |
| 3,119,693 | 1/1964 | Colten | 426/593 |
| 3,754,928 | 8/1973 | Haney | 426/631 |
| 3,868,469 | 2/1975 | Chalin | 426/593 |
| 3,997,680 | 12/1976 | Chalen | 426/631 |
| 4,235,939 | 11/1980 | Kimberly | 426/631 |
| 4,262,031 | 4/1981 | Carpenter | 426/631 |
| 4,343,818 | 8/1982 | Eggen | 426/631 |
| 4,435,436 | 3/1984 | Terink | 426/631 |
| 4,568,553 | 2/1986 | Murray | 426/631 |
| 4,758,444 | 7/1988 | Terauchi | 426/631 |
| 4,784,866 | 11/1988 | Wissgott | 426/262 |
| 4,871,562 | 10/1989 | Terauchi | 426/631 |
| 5,009,917 | 4/1991 | Weant | 426/262 |

Primary Examiner—Carolyn Paden
Attorney, Agent, or Firm—Gravely, Lieder & Woodruff

[57] ABSTRACT

A process for making brown, red, dark red or black cocoa from natural cocoa powder using spray drying, short cocking times, low pressures and temperature.

18 Claims, 3 Drawing Sheets

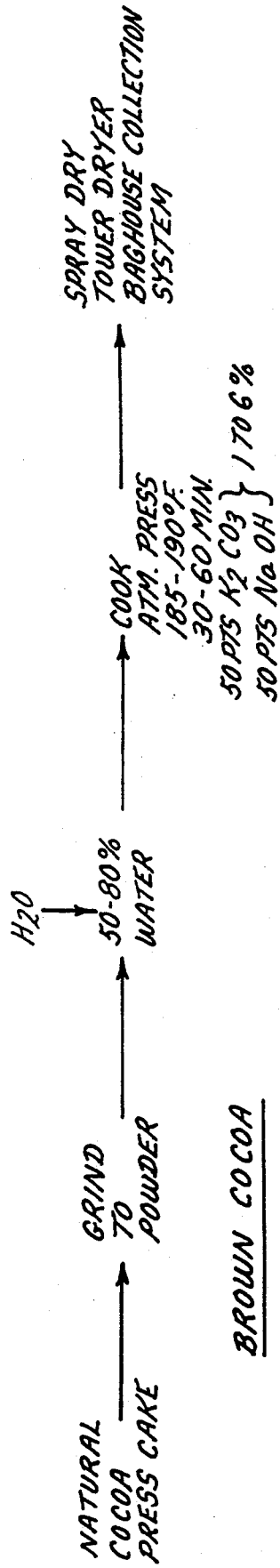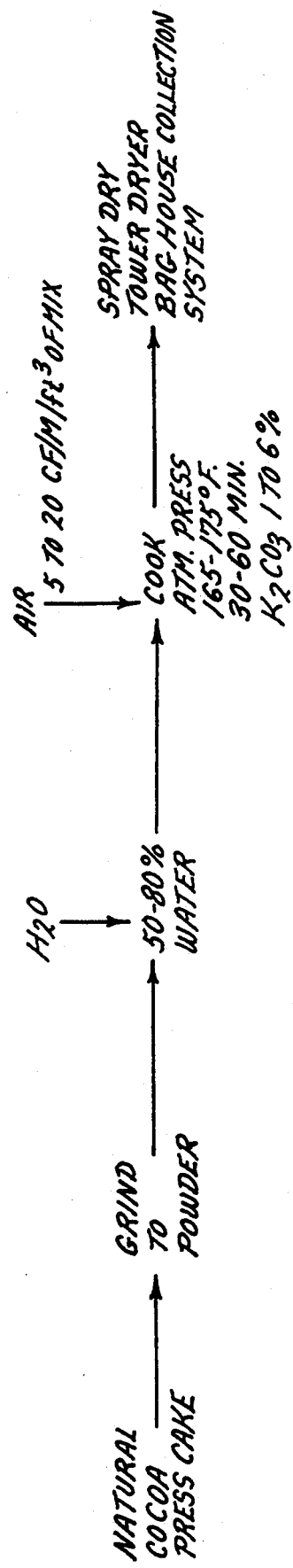

DARK RED COCOA

BLACK COCOA

PROCESS FOR MAKING DARK COCOA

BACKGROUND OF THE INVENTION

The present invention relates to a process for making red, brown or black cocoa from natural cocoa powder.

Conventional dark cocoa processes use cocoa press cake which is made up of one-half to one and one-half inch pieces. This requires high temperatures, pressures and long cook time. The color is difficult to control and it is very difficult to grind the dark cocoa. The present process uses ground natural cocoa as a starting material. The natural cocoa is easier to grind than the dark cocoa and the equipment has a longer useful life.

The present process uses larger amounts of water, lower cooking temperature, atmospheric pressure and shorter processing times as compared to conventional processes. Because of the powdered state, color control is more accurate and the final product can be spray dried which results in better production, less loss and more efficient drying.

These and other objects and advantages of the present invention will become apparent hereinafter.

SUMMARY OF THE INVENTION

The present invention comprises a method of making dark cocoa from cocoa powder in a water slurry at a temperature below about 200° F. in less than about 60 minutes and spray drying the final product.

DESCRIPTION OF THE DRAWINGS

In the accompanying drawings which form part of the specification and wherein like numerals and letters refer to like parts wherever they occur:

FIG. 4 is a specific process for making brown cocoa powder;

FIG. 5 is a specific process for making red cocoa;

DETAILED DESCRIPTION

First Prior Art Process

Figure 1:
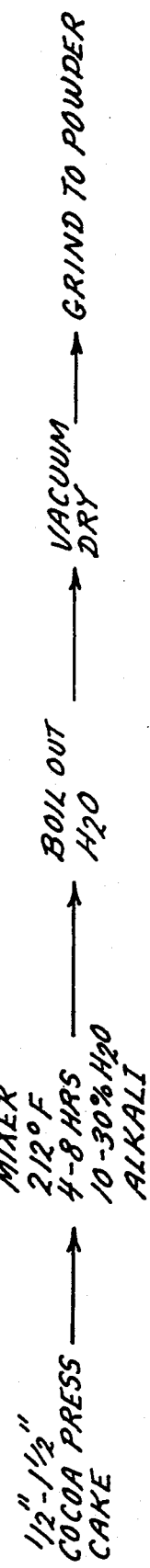
FIG. 1 is one example of a process of the prior art.
Figure 2:
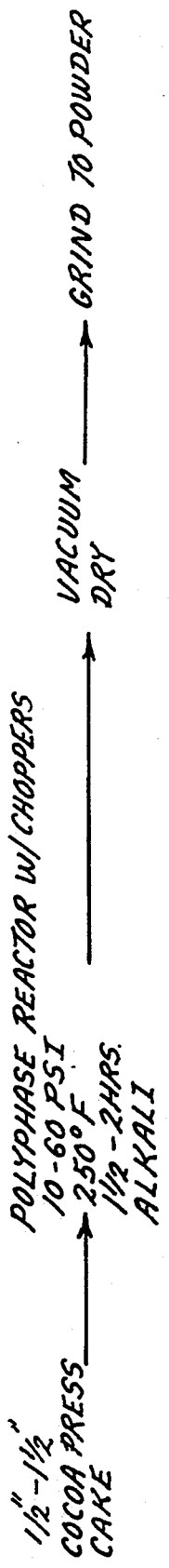
FIG. 2 is another example of a process of the prior art.
Figure 3:
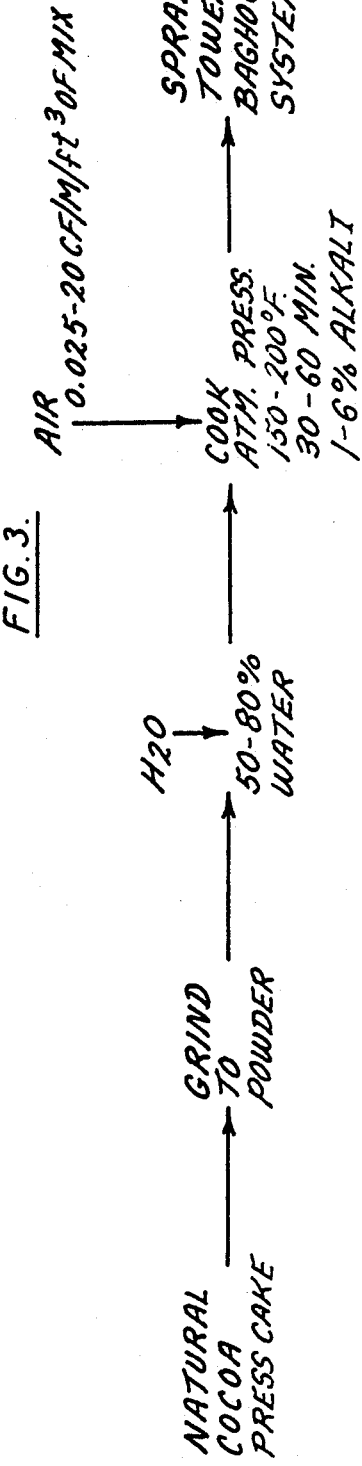
FIG. 3 is a generic process of the present invention.
Figure 6:
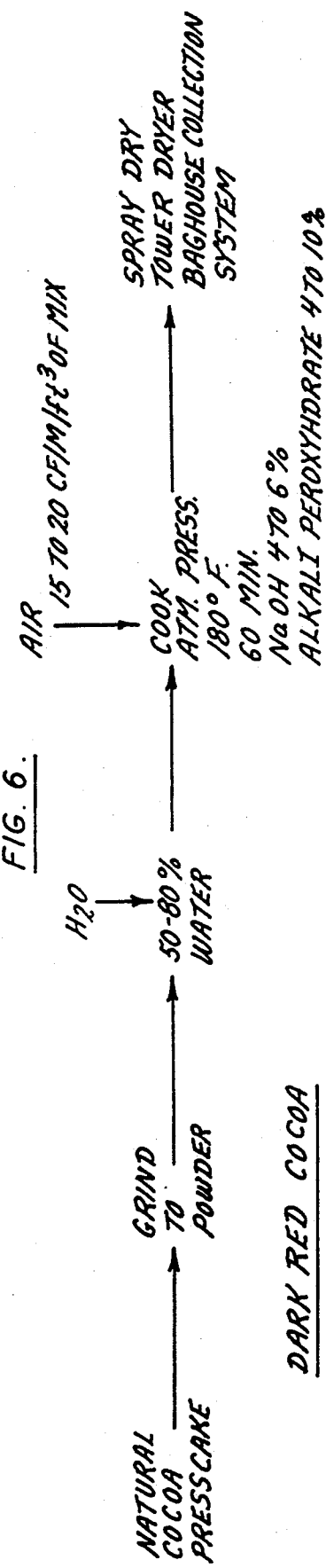
FIG. 6 is a specific process for making dark red cocoa.
Figure 7:
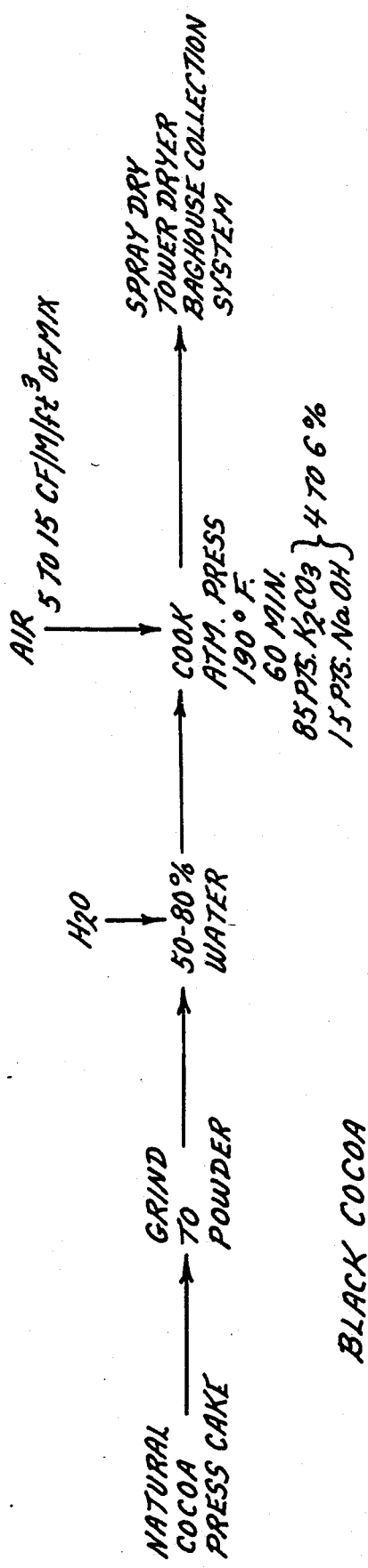
FIG. 7 is a specific process for making black cocoa.

Cocoa press cake composed of particles ranging in size from ½" to 1½" pieces is put into a jacketed paddle or ribbon mixer. Water (approx. 10-30%) and alkali are added and the mixer is started. Steam is turned on to the jacket and the batch is heated. Due to the type of mixer being used, the maximum temperature obtainable is 212°. It takes about 4-8 hours of cooking to make the cocoa turn black. The low amount of water and large size of cocoa cake pieces makes for poor penetration of the water and alkali within the pieces, so when the cocoa is ground, the lighter colored inside portion of the cocoa cake dilutes the overall color. The product then needs to be dried. This is done by boiling out the water and vacuum drying the rest. This is a very long process and very difficult to control. After the product is dried and cooled, it needs to be ground into powder. The mills that do this grinding require many more repairs, because they were made for natural process cocoa which is much easier to grind.

Second Prior Art Process

A newer method of making dark cocoa powder replaces the mixer with a polyphase reactor. This is a heated and cooled mixer that will operate under vacuum or pressure. It normally has 1 or 2 chopper motors with choppers inside the machine to help break down the cocoa cake while the process is going on. The process is the same, except the cooking time can be shortened. Under pressure, the temperature can be increased to 250° F. The higher temperature can reduce the cooking time to 1½-2 hours. The product can then be dried in the same vessel under vacuum. The cooling and grinding are the same as with first process. With both of these processes, there is no good way to test the material for proper color until the process is complete and product is ground into a powder.

The present process involves making dark cocoa, i.e., brown, red or black cocoa from natural cocoa powder. As noted, the normal process is done with cocoa press cake and is ground into powder afterwards. Natural cocoa cake is much easier to grind than black and the color is obtained much quicker due to the alkali penetration of the smaller particles.

This process is done with much more water than the conventional method, 50-80% vs. 20-40%. The higher water amount during processing allows for lower cooking temperatures to develop the dark color, i.e., 150°-200° F. vs. 212°-250° F. for the conventional processes.

This product may be sparged (injected) with compressed air during the cooking process to allow more oxygen to the cocoa particles. About 0.025 to about 20 CFM of air per cubic ft. of cocoa/water mixture can be used. With this process, the product can be cooked at atmospheric pressure vs. 10-60 psi for conventional processes.

If additional oxygen is needed, dry peroxide or alkali peroxyhydrate can be added in an amount of about 4% to about 10% (d.s.b.) by weight. The peroxide is especially useful in making dark red cocoa as well be seen hereinafter.

The product is alkalized with 1-6% (d.s.b.) alkali. Potassium carbonate and/or sodium hydroxide are the preferred alkali.

As will be explained hereinafter, by altering the water amodunt, the air flow, the cooking temperature, or the alkali, the color of the cocoa powder can be varied from black to brown to red.

The very liquid state of this product allows for easy process quality control. The color for each batch can be tested and adjusted before the product is dried, which makes for a more uniform product.

With this process, the cooking time can be reduced from 1½-8 hours in conventional processes to 30-60 minutes.

The end product is more soluble than black cocoa which is ground after processing and produces more color and better consistency.

Due to the high water content and the uniform particle size of the ground cocoa this process begins with, spray drying is the desired method of drying. Conventional black cocoa is vacuum dried or dried by some other less efficient method than spray drying.

This process, when dried in a tower drier with a baghouse type collection system, yields a much higher production rate and less product loss than any other method of black cocoa production.

I am aware of Durrenmatl U.S. Pat. No. 2,380,158 which makes a cocoa extract. This product has no fat whereas my product may have any fat level desired. Also the product is made from cocoa nibs or beans and uses a high temperature (150° C.) in a closed vessel under pressure to make an alkalized cocoa from powder with no control over the color.

General Process

In the present process, natural cocoa powder is used as the starting material. This is made from ground cocoa press cake. The natural cocoa powder has a particle size of about 50 to about 75 microns. This is placed into a mixer with 50 to 80 percent water and the batch is cooked with one to six percent (d.s.b.) alkali, preferably potassium carbonate and/or sodium hydroxide. The cooking is at atmospheric pressure, about 150 to about 200 degrees F. for about 30 to about 60 minutes. The cooking mixture may be sparged with air in the amount of 0 to about 20, preferably 0.025 and 20 cubic feet per minute/per cubic foot of mixture. The treated product is then spray dried in a tower dryer using a bag house collection system or a cyclone collection system.

In making dark red chocolate dry peroxide (alkali peroxyhydrate) in the amount of about 4 to about 10% (d.s.b.) by weight of the reaction mixture is used.

Brown Cocoa Process

Brown cocoa preferably is made when about 1 to about 6% (d.s.b.) of a 50—50 blend of potassium carbonate and sodium hydroxide is used as the alkali. Only the oxygen in the water is needed to make the cocoa brown. I do not add compressed air or oxidizer when making brown cocoa. 185-190° F. is the preferred temperature and the preferred working time is approximately 30-60 minutes.

Red Cocoa Process

Red cocoa requires about 1 to about 6% (d.s.b.) potassium carbonate for the alkali and a large amount, about 5 to about 20 CFM per cubic foot of slurry, of compressed air is injected into the slurry to develop a good red color. The preferred temperature is about 165-175° F. for approximately 30-60 minutes.

Dark Red Cocoa Process

Very dark red cocoa (approximately 3 times darker than normal red cocoa) requires soxium hydroxide and an oxidizer such as dry peroxide or alkali peroxyhydrate (which becomes oxygen and evaporates). This product also requires as much oxygen as possible. Compressed air injection is the desired source of the oxygen in addition to the peroxide. 180° F. is the preferred temperature for approximately 1 hour. About 4 to about 6% (d.s.b.) sodium hydroxide and about 4 to about 10% (d.s.b.) dry hydrogen peroxide are used. About 15 to about 20 CFM per cubic foot of mix of compressed air is injected into the mixture.

Black Cocoa

Black cocoa works best when about 4 to about 6% (d.s.b.) of an 85-15 blend of potassium carbonate and sodium hydroxide is used. It also requires a large volume of compressed air for oxygen supply, but needs no other oxidizer. About 190° F. is the preferred temperature for approximately 1 hour. About 5 to about 15 CFM per cubic foot of mix of compressed air is used.

Following are specific examples of making brown, red, dark red, and black cocoa powder in 1000 lb. lots.

| Example No. 1 - RED COCOA | |
|---|---|
| Natural cocoa powder | 960 lbs. |
| Water | 3500 lbs. |
| Heat to 160° F., Add | |
| Potassium carbonate | 40 lbs. |
| Water | 500 lbs. |

Heat to 175° F. for approximately 60 minutes with air injection 5-20 CFM.
Spray dry with outlet temperature of approximately 200-210° F.

| Example No. 2 - DARK RED COCOA | | |
|---|---|---|
| Natural cocoa powder | 940 lbs. | |
| Water | 3000 lbs. | |
| Heat to 160° F., Add | | |
| Sodium hydroxide | 60 lbs. | |
| Dry peroxide | 40 lbs. | (Alkali peroxyhydrate) |
| Water | 340 lbs. | |

Heat to 180° F. for approximately 60 minutes with air injection 15-20 CFM.
Spray Dry with outlet temperature at approximately 200-210° F.

| Example No. 3 - BLACK COCOA | |
|---|---|
| Natural cocoa powder | 950 lbs. |
| Water | 3600 lbs. |
| Heat to 160° F., Add | |
| Potassium carbonate | 7.5 lbs. |
| Sodium hydroxide | 42.5 lbs. |
| Water | 400 lbs. |

Heat to 190° F. for approximately 1 hour with air injection 5-15 CFM.
Spray dry with outlet temperature of approximately 200-210° F.
Black color shade can be adjusted by adding 0.01-0.5% ferrous sulfate.

| Example No. 4 - BROWN COCOA | |
|---|---|
| Natural cocoa powder | 950 lbs. |
| Water | 3000 lbs. |
| Heat to 160° F., Add | |
| Potassium carbonate | 25 lbs. |
| Sodium hydroxide | 25 lbs. |
| Water | 500 lbs. |

Heat to 185° F. for approximately 45 minutes.
Spray dry with outlet temperature of approximately 200-210° F.

This invention is intended to cover all changes and modifications of the example of the invention herein chosen for purposes of the disclosure which do not constitute departures from the spirit and scope of the invention.

What is claimed is:

1. A process for making dark cocoa from cocoa powder comprising the steps of
   a. forming a slurry of at least about 50% water and natural cocoa powder,
   b. heating the slurry at atmospheric pressure for less than about 60 minutes with about 1 to about 6% dry solids basis (d.s.b.) alkali at a temperature below about 200° F.,
   c. spray drying the resultant dark cocoa powder, and
   d. recovering a whole dark cocoa powder.

2. The process of claim 1 including the step of injecting compressed air into the reaction mixture.

3. The process of claim 2 wherein about 0.025 to about 20 cubic feet per minute (cfm) compressed air per cubic foot of mixture is injected.

4. The process of claim 2 wherein about 4 to about 10% (d.s.b.) by weight alkali peroxyhydrate is added to the reaction mixture.

5. The process of claim 1 wherein about 50% to about 80% water is in the slurry.

6. The process of claim 1 wherein the mixture is reacted for about 30 to about 60 minutes.

7. The process of claim 1 wherein the temperature is about 160° to about 180° F.

8. The process of claim 1 wherein the particles are about 50 to about 75 microns in size.

9. The process of claim 1 including the step of grinding cocoa press cake into a powder prior to forming the water slurry.

10. The process of claim 1 wherein the alkali is selected from potassium carbonate, sodium hydroxide and mixtures thereof.

11. The process of claim 1 wherein the reaction mixture contains about a 1/1 ratio of potassium carbonate to sodium hydroxide as the alkali, the temperature of reaction is about 185°-190° F., the reaction time is about 30-60 minutes and a brown cocoa powder is recovered.

12. The process of claim 11 wherein about 1 to about 6% (d.s.b.) alkali is used.

13. The process of claim 1 wherein potassium carbonate is the alkali, about 5 to about 15 CFM compressed air/cubic foot of reaction mixture is used, the time is about 30-60 minutes, the temperature is about 165°-175° F. and a red cocoa powder is recovered.

14. The process of claim 13 wherein about 4 to about 6% (d.s.b.) sodium hydroxide is used.

15. The process of claim 1 wherein sodium hydroxide is the alkali and about 4 to about 10% (d.s.b.) by weight dry peroxide is added, about 15 to about 20 CFM compressed air/cubic foot of reaction mixture is added, the temperature is about 180° F., the time of reaction is about 60 minutes and a dark red cocoa powder is recovered.

16. The process of claim 15 wherein about 4 to about 6% (d.s.b.) sodium hydroxide is used.

17. The process of claim 1 wherein the alkali is a blend of about 85 parts of potassium carbonate to 15 parts of sodium hydroxide, about 5 to about 15 CFM compressed air/cubic foot of reaction mix is added, the temperature is about 190° F., the time is about 60 minutes, and a black cocoa powder is recovered.

18. The process of claim 17 wherein about 4 to about 6% (d.s.b.) alkali is used.

* * * * *